Aug. 15, 1933.   G. LANE ET AL   1,922,963
APPARATUS FOR LENS ADJUSTMENT IN DOUBLE LENS PROJECTION
Filed June 9, 1928
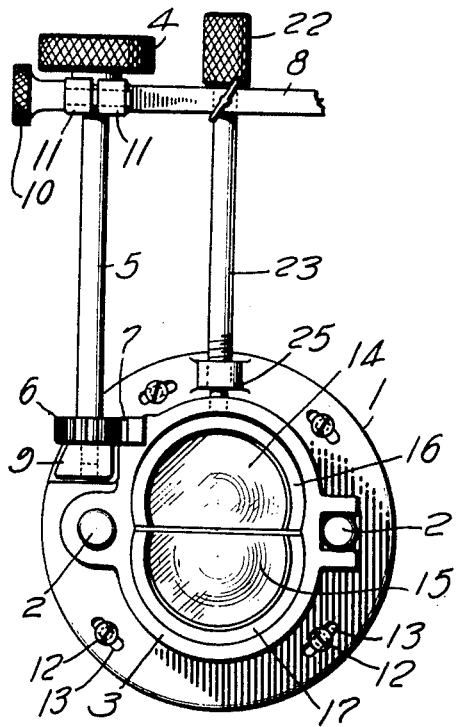
Fig. 1.
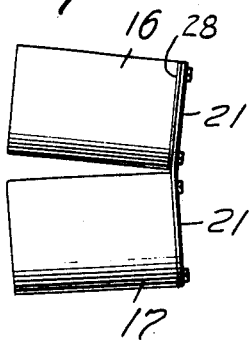
Fig. 5.
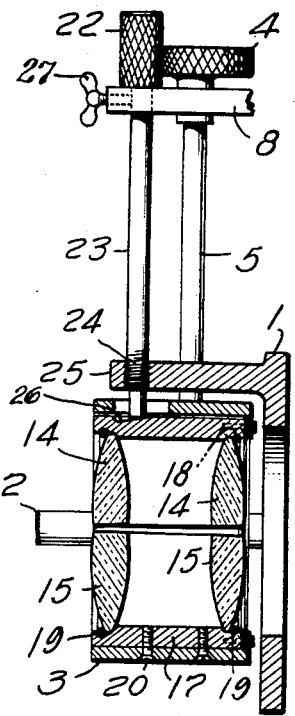
Fig. 2.
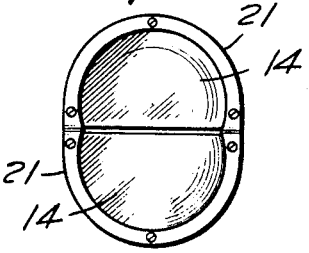
Fig. 6.
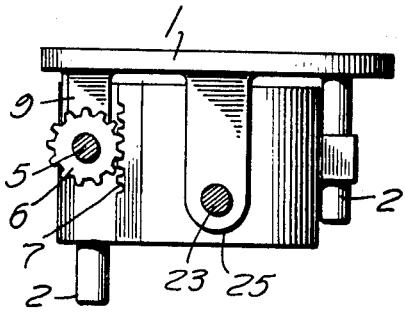
Fig. 3.
Fig. 4.
Inventors
GEORGE LANE,
JOHN E. PATTERSON,
By Spear, Middleton Donaldson, Hall
Attorneys Patented Aug. 15, 1933

1,922,963

UNITED STATES PATENT OFFICE 1,922,963

APPARATUS FOR LENS ADJUSTMENT IN DOUBLE LENS PROJECTION

George Lane, New Haven, Conn., and John E. Patterson, Poughkeepsie, N. Y.

Application June 9, 1928. Serial No. 284,152

13 Claims. (Cl. 88—16.6)

This invention relates to a method and means for improving the visual effects of projecting moving pictures or the like, where more than one picture is projected simultaneously. Where this circumstance exists it is necessary to use a double lens either directly adjacent each other or slightly spaced apart, as is shown in our prior Patent No. 1,514,543.

The principal object of the invention is to provide lenses which may be adjusted in relation to each other so that their projected axes will reach a common point upon the screen where the projected pictures are viewed.

In systems of projection such as above described, the two pictures are superimposed upon the same screen area and if the axes of the two lenses are parallel to each other, which they usually are, this must of necessity cause a certain amount of distortion of the composite picture on the viewing screen.

Another important object is the provision of a lens assembly which may be adjusted laterally and fore and aft by simple mechanism so that absolute register of the projected pictures may be secured in order to produce the maximum optical correctness.

The invention also proposes to make use of certain instrumentalities such as shims to accomplish proper relative focus between lenses to correct for inaccuracies therein.

Other objects and advantages will be apparent as the description proceeds.

To this end the invention contemplates the provision of a pair of lenses each to accommodate its own picture, the area of the lens being greater than the area of the picture projected therethrough. In such cases it is either necessary to space the pairs of lenses apart a distance greater than the distance between centers of the pictures on the film strip, or else mutilate the lenses so that the distance between their axes is approximately the distance of the picture centers. In the former instance the image can be made to reach the lens only by means of mirrors or the like which cause distortion unless they are perfectly plane. In the latter case, the mutilation of a portion of the lens in order that the pairs may lie adjacent each other at chordal portions does not materially affect the optics of the situation and on the other hand, produces a mechanical combination which is extremely desirable and with which maximum results may be secured.

The invention contemplates, in the form in which lenses chordally adjacent are used, the provision of separate lens barrels conforming substantially to the contour of the lens pairs which they contain. These barrels are mounted upon a spring steel flexible connecting head which normally tends to separate the far ends of the lens barrels so that the axes of the lens pairs are at an angle to each other. It is desirable to rigidly mount the lower lens in the assembly and provide for angular adjustment of the upper lens barrel only, although this is not necessary.

Adjustment of the lens axes is brought about by means of an adjusting screw suitably mounted on a part of the machine body and having a portion movably engaging one of the lens barrels, preferably the upper. Movement of this threaded adjustment screw in the proper direction will cause the front portion of the upper lens barrel to approach the lower lens barrel against the tension of the spring connecting head. The two lenses are arranged on the connecting head in such relation that the axes of the two lenses may be made to converge at a point beyond the front of each lens.

In some instances, it may be necessary to insert a shim or shims between a lens barrel and the spring head in order to accomplish the proper relative focus between lenses and thus correct slight inaccuracies in the lenses which may exist. This shim may be of any desired thickness and be applied to either lens barrel.

It is desirable to mount the entire lens assembly in a casing slidable longitudinally upon guides carried by the lens mount with means for moving this assembly toward or away from the projector or in a fore and aft direction in relation to the lens axes, thus permitting focal adjustment.

Lateral adjustment is accomplished by securing the lens assembly to its mount by screws operating in limited slots so as to permit the rotating to a slight degree of the entire lens mount. This lateral adjustment, once properly made need never be changed.

Means are provided whereby the various adjusting screws may be locked in any desired position to prevent accidental displacement due to the vibration of the machine in continuous operation.

The invention further consists in the novel arrangement and construction and combination of parts, and the utilization thereof, more fully described hereinafter and shown in the accompanying drawings, in which:

Figure 1 is a front elevation of an assembly embodying our invention.

Fig. 2 is a side elevation partly in section.
Fig. 3 is a plan view partly in section.
Fig. 4 is a side elevation.
Fig. 5 is a detail of the lens assembly.
Fig. 6 is a rear view of Fig. 5.

Referring now to the embodiment illustrated, there is shown at 1 the base of a lens mount adapted to be attached to a projector balance. The base 1 carries guides 2. Slidingly engaging these two guides is a sleeve portion 3 movable under impulse of the knurled head 4 through its shaft 5 which carries pinion 6 meshing with rack 7. The shaft 5 is carried in its upper portion in a bearing 8 and at the lower end in a bearing 9, each of which bearings is shown carried by the lens mount.

A locking device comprising a screw 10 is provided, which is threaded to the projecting portions 11 of the bearing 8 so that when the proper fore and aft adjustment has been made of the lens mount, the screw 10 may be tightened, which causes the bearing to grip the shaft 5 and prevent accidental displacement thereof.

The base 1 may be mounted on the mechanism by means of screws 12 operated in the slots 13 so that by slightly backing off the screws the entire assembly may be slightly rotated, which rotation carries the lens axes in opposite directions thus accomplishing lateral adjustment. Once this has been secured, the screws 12 may be tightened and the device maintained in that position.

The lenses proper comprise individual pairs 14 and 15, each of which is mounted in a separate barrel 16 and 17, respectively, the lenses being maintained within the barrels as by snap wires 18 and 19.

The lower barrel 17 is rigidly secured to the portion 3 of the mount as by screw 20 and also fixed to the spring steel flexible connecting head 21 which is at the rear of the lens assembly or adjacent the aperture plate. The upper lens barrel 16 is attached to the upper portion of the head 21.

The head is so made that its natural spring tendency will attempt to separate the forward ends of the lens barrels, as shown in Fig. 5. The two lens barrels are so mounted upon the head 21 that their attached ends are separated to such an extent that their forward ends may be brought together sufficiently, by means to be described hereinafter, so that the projected axes of the lens pairs will coincide upon the viewing screen.

In order to correct for slight inaccuracies in the lenses themselves and to accomplish proper relative focus between the lens combinations, a shim 28 may be inserted between a lens barrel 16 and the head 21. Obviously this shim or shims may be any desired thickness and may be used between either barrel and the head as desired.

Lens axes adjustment means are provided which consist of the knurled head 22, the shaft 23 of which is mounted for rotation in the part 8, the lower intermediate portion of which is threaded as at 24 to the portion 25 of the base 1 of the lens mount.

The bottom of the shaft 23 engages a bearing surface 26 on the lens barrel 16. This surface is slightly inclined, being lower at the front than at the rear thereof in order to compensate automatically for the convergence in proper relation to the focal adjustment. It will be seen that moving the end of shaft 23 against the bearing surface 26 will oppose the tendency of the spring head 21 to separate the forward ends of the lens barrels.

The operation of the assembly is as follows:

Lateral adjustment is made as above described by means of the relation of the screws 12 in the slots 13.

Fore and aft, or focal adjustment may be readily made by operating the knurled head 4 and locking screw 10.

The third adjustment is that of axes convergence and is accomplished by properly moving the knurled head 22 and its locking part 27 which operates in a similar manner to the locking means for head 4.

It will be seen that by properly moving the head 22 the axes of the upper and lower lenses may be made to converge upon the same point on the viewing screen. Focal adjustment and convergence being similarly functions of distance, for any given distance from the screen these adjustments are relatively the same and similar except for the item of film shrinkage.

The inclined surface 26 on the movable barrel cooperates with the lower end of the adjusting stem 23 in securing automatic adjustment of the upper lens barrel relative to the lower for distance and this stem 23 is used for manually adjusting the relation between the barrels for shrinkage. In other words the structure provides for both the automatic vertical registration adjustment for distance that works with the focusing and a manually independent adjustment in addition for shrinkage. The automatic adjustment takes care of both focusing and registration for changed distances from the screen when using the same film.

It varies the vertical separation in accordance with the distance from the film and therefore (assuming the parts properly shaped and proportioned) registration on the screen from a given film remains correct regardless of distance of the projector from the screen.

The manual adjustment takes care of adapting the mechanism to different amounts of film shrinkage. The matter of film shrinkage is a serious problem as new film or old dried out film may vary in actual practise as much as .004 of its distance between centers—quite too much for satisfactory registration. This manual adjustment facilitates perfecting the registration at any time.

We claim:

1. Means for improving the effects of picture projection where two pictures are simultaneously projected through two lenses upon the same screen area, including two lens barrels spaced from each other, a pair of lenses in each barrel, a spring head carrying both barrels at one end thereof and tending to separate them at the other end, and adjusting means having one end engaging a bearing surface on one barrel opposing the tendency of the spring head.

2. Means for improving the effects of picture projection where two pictures are simultaneously projected through two lenses upon the same screen area, including two lens barrels spaced from each other, a pair of lenses in each barrel, a spring head carrying both barrels at one end, one barrel being rigidly carried by a mount, the head tending to separate the other end of the barrels, and adjusting means engaging a bearing surface on one barrel, whereby the lens barrels may be made to approach each other at one end nearer than at the other.

3. Means for improving the effects of picture projection where two pictures are simultaneously projected through two lenses upon the same screen area, including two lens barrels adjacent each other, each barrel carrying a pair of lenses, a spring head to which are secured both barrels at one end, said spring head tending to separate the barrels at their other ends, and a shim between one barrel and the head.

4. Means for improving the effects of picture projection where two pictures are simultaneously projected through two lenses upon the same screen area, including two lens barrels each carrying a pair of lenses, said barrels being carried in a sleeve, a lens mount having guide rods projecting laterally therefrom, said sleeve being mounted between and slidingly engaging said guides, and means to move the sleeve on the guides toward and away from a viewing screen.

5. Means for improving the effects of picture projection where two pictures are simultaneously projected through two lenses upon the same screen area, including two lens barrels each carrying a pair of lenses, said barrels being carried in a sleeve, a lens mount having guides projecting therefrom, said sleeve slidingly engaging said guides, said mount being secured to a portion of a projection apparatus by means of a screw and slot arrangement, permitting slight rotation of the mount in regard to the projecting apparatus.

6. Means for improving the effects of picture projection where two pictures are simultaneously projected through two lenses upon the same screen area, including two lens barrels each carrying a pair of lenses, said barrels being carried in a sleeve, a lens mount having guides projecting therefrom, said sleeve slidingly engaging said guides, and means to move the sleeve on the guides toward and away from a viewing screen, said mount being secured to a portion of a projection apparatus by means of a screw and slot arrangement, permitting slight rotation of the plate in regard to the projecting apparatus.

7. In combination, a sleeve, a barrel fixed in said sleeve and carrying a pair of lenses, a second barrel within the sleeve carrying a pair of lenses, a spring head connecting said second barrel with the first barrel at one end leaving the other end free to be moved towards and from the first barrel, and means for moving the second barrel towards and from the first barrel at said free end, substantially as described.

8. In combination, a pair of lens carriers, a mounting for said carriers yieldingly holding them in convergent relation in respect to their axes, manually operable means for adjusting the pair of lenses for focusing and means including a cam device and a part bearing thereon which as a consequence of the movement of said lens carriers for distance adjusts said carriers for convergence, substantially as described.

9. Apparatus according to claim 8 having means to manually adjust the lens barrels angularly relative to each other, said manual means forming a part of the automatic adjustment means.

10. Apparatus according to claim 8 in which the lens barrels are relatively adjustable by hand operated means to vary their angular relation to each other in addition to said automatic adjustment, which also varies the angular relation between the barrels, substantially as described.

11. In combination a pair of lens supporting barrels relatively adjustable angularly in respect to each other for superimposing their projected pictures upon the same screen area, a manually adjustable member for variably setting one lens supporting barrel angularly relative to the other, and an inclined bearing on said lens barrel to engage said member for automatically and angularly adjusting said lens barrel relative to the other, as a consequence of and while said barrels are being set for distance, and means for setting said barrels for distance, substantially as described.

12. In combination a pair of lens barrels each carrying a pair of lenses, means for stressing one lens barrel to move away from the other at one end while substantially maintaining its relation to said other barrel at its other end, a member engaging the free end of the barrel for adjusting it relative to the other barrel, means cooperating with said member for adjusting said barrel automatically relative to the other when the barrels are adjusted for distance and means for adjusting for distance, substantially as described.

13. Apparatus according to claim 12 in which a sleeve carries the barrels, a base slidably supports said sleeve, the said member passing through a portion of the base and the sleeve and the means on the barrel which cooperates with said member being an incline surface, substantially as described.

GEORGE LANE.
JOHN E. PATTERSON.